RADIO RECEIVER REGULATING VOLTAGE CIRCUIT

Filed June 28, 1954

INVENTORS
JAAP STARREVELD
ANTONIE CORNELIS DE KLERK

BY [signature]

AGENT 2,874,275
Patented Feb. 17, 1959

2,874,275

RADIO RECEIVER REGULATING VOLTAGE CIRCUIT

Jaap Starreveld and Antonie C. de Klerk, Hilversum, Netherlands, assignors, by mesne assignments, to North American Philips Company, Inc., New York, N. Y., a corporation of Delaware Application June 28, 1954, Serial No. 439,762

Claims priority, application Netherlands July 10, 1953

9 Claims. (Cl. 250—20)

The present invention relates to regulating voltage derivation in a radio receiver system. More particularly, the invention relates to radio-receiving sets comprising a device for deriving a regulating voltage from the modulator intermediate-frequency or high-frequency signal voltage, which regulating voltage is applied to the grids of one or more amplifying tubes of the set so as to compensate any fluctuations of the input signal amplitude which result from random conditions. For such automatic gain control use is generally made of a rectifier, more especially a diode, to whose circuit the modulated signal voltage is supplied after amplification, which circuit moreover comprises a source supplying a so-called threshold voltage. This threshold voltage insures that the rectifier does not become operative until the amplitude of the signal voltage supplied to the circuit exceeds a given value, so that the automatic gain control does not become operative until the signal voltage attains this value.

The present invention has for its object to provide a device of this type in order to secure a very effectual control so that the regulating voltage increases rapidly in absolute value with an increase in signal voltage from a given value of the signal voltage and upwards.

It has been suggested that the regulating voltage be amplified prior to applying it to the grids of the tubes. This consequently necessitates the use of a direct voltage amplifier which, as is known, entails difficulties. Therefore, the direct voltage amplifier is omitted in the receiving set according to the invention.

A further object of the invention is to provide such a device as to secure so-called quiet tuning in a very simple manner, that is to say that the receiver is inoperative until the signal amplitude attains a given value.

The invention concerns a radio-receiving set of the type referred to in the preamble, which comprises a rectifier to whose circuit the modulated signal voltage is supplied and wherein a threshold voltage is moreover active so that the rectifier does not become operative until the amplitude of the signal voltage exceeds a given value. In accordance with the invention, the threshold voltage is at least 40 volts and the signal voltage, prior to being supplied to the circuit of the rectifier, undergoes such an additional amplification as to be able to surpass the threshold voltage even with comparatively low signal amplitudes. In the present case, the term "additional amplification" is to be understood to mean a degree of amplification exceeding the conventional amplification required for obtaining a satisfactory output signal.

In known systems, the threshold voltage is, in general, only a few volts, e. g. a maximum of 10 volts, so that it can be surpassed by the signal voltage without additional amplification of the signal. The use of a much higher threshold voltage yields a better control and still further advantages referred to hereinafter.

When using the invention it will, in general, be necessary to employ an additional amplifying tube for the signal voltage in order to secure such a signal amplitude in the regulating voltage circuit that it exceeds the threshold voltage in the case of a not too large input signal.

The threshold voltage may be taken from a voltage divider connected in parallel with the power supply of the system. Preferably it is approximately 80 volts or higher. As an alternative the threshold voltage may be supplied by a glow discharge tube which is conducting under normal operating conditions and connected in series with a resistor to the power supply. The glow discharge tube may be a neon tube whereof the glow discharge voltage, which is substantially independent of the current passing through the tube is 85 volts. This consequently yields a threshold voltage which does not substantially change in the case of supply voltage variations. The volatge of the neon tube is entirely or for the greater part used as a threshold voltage in the circuit for deriving the regulating voltage.

The high amplification of the modulated signal permits the signal voltage, from which the modulation voltage to be reproduced is derived, to be taken from so small a portion of the output transformer as to enable in a simple manner direct adaptation of different loads. Gradient limitation, or limitation of steep output voltage peaks, may be simply and facilely utilized in a manner discussed hereinafter.

In order that the invention may be readily carried into effect, it will now be described with reference to the accompany drawing, wherein:

Figs. 1 and 2 represent two forms of circuit-arrangements for receiving systems according to the invention.

Figure 1:
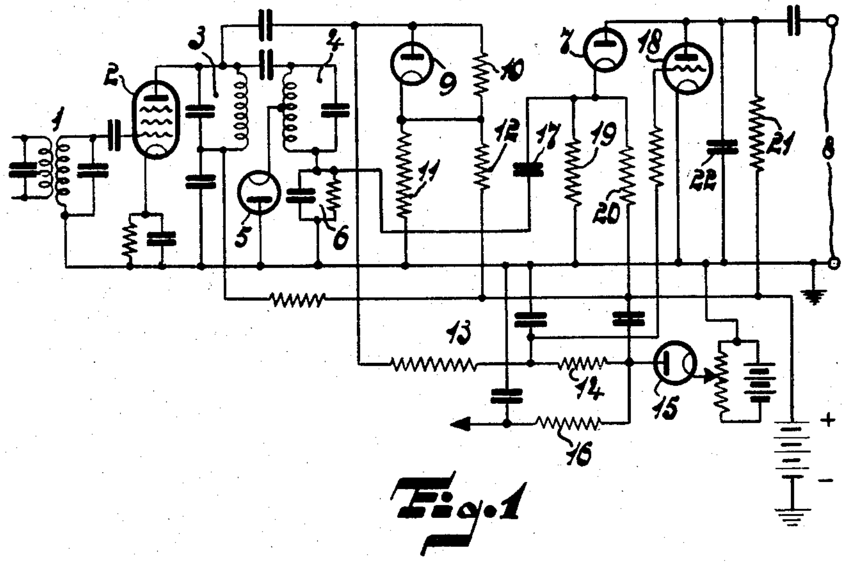
Fig. 1 is a schematic diagram of an embodiment of a radio receiver embodying the arrangement of the press invention.

Fig. 1 indicates the present invention as utilized in a superheterodyne receiver, for the purpose of clarity. In this figure, a band-pass filter 1 comprises circuits tuned to the intermediate-frequency carrier wave. The amplified intermediate frequencies are supplied to the primary circuit of said band-pass filter. The secondary circuit of said band-pass filter is connected between the first control grid and the cathode of an intermediate-frequency amplifying tube 2 represented by a pentode. The anode circuit thereof comprises an intermediate-frequency band-pass filter comprising circuits 3 and 4 which are also tuned to the intermediate-frequency carrier. The direct voltage for automatic gain control is derived from the circuit 3 and the modulation voltage is derived from the circuit 4.

The latter is effected by means of a diode 5 which is connected to a tapping point of the inductance of the circuit 4 and whose anode is connected to ground. Connected between the lower end of the circuit 4 and ground is the parallel-connection 6 of a resistor and a capacitor, the latter having such a value as to constitute a small capacitative reactance with respect to the intermediate-frequency oscillations.

The low-frequency oscillations occurring across the parallel connection 6 are supplied by way of a capacitor 17 and the diode 7, which is conducting during normal reception, to one of the output terminals 8. The other terminal 8 is grounded. In a manner described hereinafter, the diode 7 serves to suppress the reception if the amplitude of the incoming signal is too small to enable satisfactory reception.

The circuit for deriving a regulating voltage comprises a diode 9 with which a resistor 10 is connected in parallel. A resistor 11 is connected between said parallel-connection and ground, a resistor 12 being connected to the positive terminal of the power supply. In accordance with the invention, the resistors 11 and 12 are so proportioned that a voltage of approximately 80 volts relative to ground is set up at their common point which is connected to the cathode of the diode 9. If the power supply voltage is 250 volts the resistor 11 may, for example, have a resistance of 40 kilohms and the resistor 12 may have a resistance of 80 kilohms. The supply of 250 volts also feeds the anode of the pentode 2. The intermediate-frequency oscillations are supplied from the circuit 3 through a capacitor to the anode of the diode 9. The anode of the diode 9 is connected, by way of the series-connection of two high resistors 13 and 14, to the anode of a third diode 15. The cathode of diode 15 is connected to a point whose voltage is slightly negative with regard to ground. The voltage for the automatic gain control of the preceding tubes is taken, through a resistor 16, from the anode of the diode 15. A number of capacitors serve to eliminate the intermediate-frequency voltage components. The voltage across the resistor 11 constitutes a high threshold voltage in the circuit of the voltage for the automatic gain control.

The circuit-arrangement so far described operates as follows:

The incoming high-frequency signal is frequency-transformed and amplified in the tube 2, so that the output voltage of intermediate frequency across the circuit 3 is of the order of magnitude of the voltage across the resistor 11 even at comparatively small signal amplitudes. As long, however, as the output voltage of the circuit 3 is lower than the voltage across the resistor 11, rectification cannot occur in the tube 9 and the voltage drop across the resistor 10 only results from the small current passing from the positive terminal of the power supply through the resistors 12, 10, 13, 14 and the diode 15.

If the amplified intermediate-frequency exceeds the threshold voltage, the diode 9 tends to become conductive so that the voltage drop across the resistor 10 increases. Provisionally, however, a negative bias will subsist at the grids of the high-frequency and intermediate-frequency amplifying tubes influenced by the control, which bias depends upon the voltage set up at the cathode of the diode 15, since said diode is still conducting. This negative bias is comparatively low, so that the amplification factor of said tubes is still high.

Denoting the voltage across the resistor 11 by $V_d$ and the potential of the cathode of the diode 15 by $V_g$, regulation will only occur if the peak voltages in the intermediate-frequency signal voltage in the circuit for the regulating voltage exceed $V_d+V_g$ volts.

The effect of the automatic gain control is determined by the ratio between the total threshold height and the total voltage in the circuit of the regulating voltage required to make the receiver fully inoperative. Denoting the required negative bias of the grids of the preceding amplifier tubes by $V_c$, the ratio between the output voltage of the rectifier 9 at the instant at which regulation commences and the output voltage at which the receiver is substantially inoperative is $$V_d+V_g:V_d+V_g+V_c$$

If $V_d$ is 85 volts, $V_g$ is 2 volts and $V_c$ is 10 volts, the ratio is 87:97, which is satisfactory.

The difference between the circuit arrangement of the present invention and those known in the art is that the usual threshold voltage of an automatic gain control circuit with a threshold voltage is about 6 volts. If $V_g$ and $V_c$ remain the same but $V_d$ is 6 volts, the corresponding ratio is $$6+2:6+2+10=8:18$$

This ratio is much smaller than the ratio between the signal voltage from the point at which the threshold is surpassed and the point at which the receiver is substantially inoperative, and is thus less desirable than that of the invention. With the known receiver better results than those indicated by the ratio are, of course, obtainable when a direct voltage amplifier is utilized for the regulating voltage, as is usual in many systems. This, however, entails several disadvantages such as, for example, instability and the necessity of using a negative supply voltage of approximately 150 volts for amplifying the regulating voltage.

The voltage $V_g$ is preferably regulable and may be readily derived from the filament voltage by rectification.

Normally, the high threshold voltage across the resistor 11 will vary when variations of the supply voltage occur; due, for example, to variations of the mains voltage in the case of mains supply. If the mains voltage should vary by 10 percent, the threshold voltage would increase or decrease by 8.5 volts. Actually the difference is smaller, since the variation is partly compensated by the automatic gain control itself. In order to obtain a substantially constant threshold voltage use may be made of the circuit-arrangement shown in Fig. 2.

Figure 2:
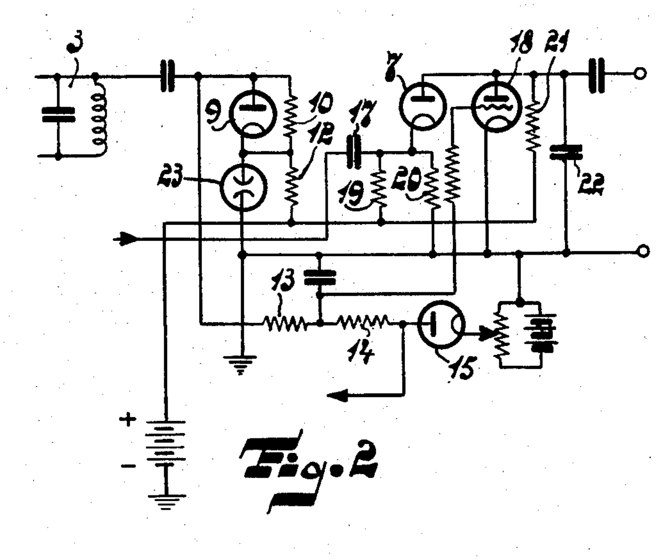
Fig. 2 is a modification of the embodiment of Fig. 1.

In Fig. 2 corresponding component parts bear the same reference numerals as in Fig. 1, the sole difference between the circuit shown in Fig. 1 and that shown in Fig. 2 being that in the latter the resistor 11 of Fig. 1 is replaced by a glow discharge tube 23 which is supplied with the power supply voltage through the resistor 12. A further advantage accruing from the use of such a glow discharge tube is that due to low effective internal resistance the voltage path governed by the quiet tuning described hereinafter is shorter.

The circuit-arrangement so far described permits so-called quiet tuning in a simple manner. To this end a voltage is derived from the circuit of the regulating voltage and is applied to the control grid of a triode 18. The derived voltage is taken from a point whereof the voltage is driven negative at comparatively small signal amplitudes with an increasing signal. In the circuit-arrangements shown in the drawing, the common point of the resistors 13 and 14 is used therefor. The triode 18 serves to interrupt the signal transmission with small signal amplitudes.

It is known to design such a circuit-arrangement for quiet tuning in such a manner that with small signal amplitudes the amplification of one of the amplifying tubes is reduced to a very low value, since a high negative voltage is applied to the control grid. With larger signal amplitudes the negative bias of said tube(s) is caused to decrease in absolute value so that signal-transmission occurs again. In the circuit arrangement of Figs. 1 and 2, interruption of the signal-transmission is the result of the action of a voltage which is low or even positive with low signal amplitudes and is driven more and more negative with higher signal amplitudes. This is achieved by connecting the anode of the diode 7 to the anode of the triode 18 so that the anode of the diode 7 is not driven positive relative to its cathode until a sufficient negative regulating voltage occurs across the common point of the resistors 13 and 14.

The two anodes are moreover connected through a resistor 21 to the positive terminal of the power supply. The cathode of the triode 18 is connected to ground; the cathode of the diode 7 being connected to ground through a resistor 19 and to the positive terminal of the supply through a resistor 20.

As long as the signal voltage is below a predetermined level, the control grid of the triode 18 is not biased. The voltage set up at the common point of the resistors 13 and 14 may then be positive with respect to ground so that grid current tends to flow in the grid circuit of the tube 18, which current is limited by the resistor connected between said common point and the grid of said tube. Due to the voltage drop across the resistor 21 the voltage on the anode of the tube 18 is considerably lower than the voltage of the power supply. The resistors 19 and 20 are are so selected that the anode of the diode 7 is negative with respect to the cathode, so that said diode is cut off and the connection between the upper output terminal and the circuit 6 is interrupted. In this case, consequently, no output signal voltage occurs across the terminals 8. Let it be supposed, for example, that the voltage on the two anodes in the absence of a signal is 100 volts at a supply voltage of 250 volts. The resistors 19 and 20 then may have values of, for example, 100 and 180 kilohms, respectively, to obtain the setting referred to.

When the voltage at the control grid of the triode 18 decreases and is driven negative, the current through this triode decreases and the voltage on the anodes of the tubes 7 and 18 increases. At a given signal voltage the anode of the diode 7 is driven positive with regard to its cathode, so that said diode passes the signal voltage across the circuit 6. In this case the low frequency output voltage is set up across the terminals 8.

As long as the intermediate-frequency peak voltage across the diode 9 is smaller than or equal to $V_d$, said diode does not operate and the control grid of the triode 18 has a positive potential. However, said grid takes current and consequently attains ground potential. If the intermediate-frequency peak voltage across the diode 9 is $V_d+V_g$ the voltage for automatic gain control is not yet active but the grid of the triode 18 has a potential $-V_g$. The circuit-arrangement for quiet tuning is preferably so adjusted that the receiver is made fully operative instead of being fully inoperative upon said variation of the grid voltage of the triode 18. This is easily obtained with the use of a normal triode.

The described circuit arrangement has the advantage of not permitting the regulating voltage to affect the preceding amplifier tubes at the instant at which the receiver is made operative. The operative range of the receiver consequently occurs within very narrow limits of the signal voltage.

In the circuit arrangement of Fig. 2, a potentiometer may be utilized to use a part of the voltage across the glow discharge tube as a threshold voltage.

Since the amplification is highly raised and consequently a high signal voltage also occurs across the circuit 4, the tapping point on the coil of said circuit, to which the cathode of the detector 5 is connected, may be low. Adequate adaptation is then secured even at a low output resistor of the circuit 6. This resistor may have a resistance of the order of several thousand ohms. Effective gradient limitation or suppression of sharp voltage peaks may be obtained without the utilization of extra amplifiers.

In the represented circuit-arrangements the diode 7 and the capacitor 22, which is connected between the output leads, serve as a gradient limitation circuit. During normal operation a given direct current passes through the diode 7. On the occurrence of a sharp voltage peak the capacitor 22 is abruptly charged in a positive sense. However, the current is limited by the diode, whose rest current limits the charging current. The charging current can naturally not exceed the rest current. Such a gradient limiter only operates satisfactorily if the resistance of the signal source, that is, the resistance of the parallel connection 6, is low. In the invention, the resistance of the parallel connection 6 may be made 100 times smaller than in the conventional receivers where the threshold voltage in the circuit for the regulating voltage is much lower.

While the invention has been described by means of specific examples and in specific embodiments, we do not wish to be limited thereto, for obvious modifications will occur to those skilled in the art without departing from the spirit and scope of the invention.

What is claimed is:

1. A radio receiver system comprising input means for a source of carrier signal, amplifying means for said carrier signal, said amplifying means having an amplification normally producing an output signal having an intensity greater than 40 volts when a usable carrier signal is applied to the input thereof, rectifying means coupled to the output of said amplifying means, said rectifying means comprising a unidirectionally conducting element having an anode and a cathode, means for applying a threshold voltage of at least 40 volts to said rectifying means thereby to produce an output regulating voltage having an intensity as defined by the intensity of said amplified carrier signal greater than 40 volts and to render said rectifying means inoperative to carrier signals applied thereto having an intensity less than 40 volts, further rectifying means coupled to the output of said amplifying means, said further rectifying means comprising a second unidirectionally conducting element having an anode and a cathode, means for interconnecting the anodes of said unidirectionally conducting elements, said connecting means comprising a high resistive element, power supply means having a positive terminal and a negative terminal, means for applying a low negative potential relative to the negative terminal of said power supply means to the cathode of said second unidirectionally conducting element, and means for applying said regulating voltage to said amplifying means to vary the amplification thereof, said means for applying said regulating voltage being connected to the anode of said second unidirectionally conducting element.

2. A radio receiver system comprising input means for a source of carrier signal, said carrier signal being modulated by an audio intelligence signal, amplifying means for said carrier signal, said amplifying means having an amplification normally producing an output signal having an intensity greater than 40 volts when a usable carrier signal is applied to the input thereof, rectifying means coupled to the output of said amplifying means, said rectifying means comprising a unidirectionally conducting element having an anode and a cathode, means for applying a threshold voltage of at least 40 volts to said rectifying means thereby to produce an output regulating voltage having an intensity as defined by the intensity of said amplified carrier signal greater than 40 volts and to render said rectifying means inoperative to carrier signals applied thereto having an intensity less than 40 volts, further rectifying means coupled to the output of said amplifying means, said further rectifying means comprising a second unidirectionally conducting element having an anode and a cathode, means for interconnecting the anodes of said unidirectionally conducting elements, means for applying said regulating voltage to said amplifying means to vary the amplification thereof, said means for applying said regulating voltage being connected to the anode of said second unidirectionally conducting element, means for deriving said audio intelligence signal from said carrier signal, an audio intelligence signal channel coupled to said deriving means and comprising a control tube connected to said second unidirectionally conducting element, and means for applying to said control tube a delay regulating voltage to render said channel inoperative when said amplified carrier signal has an intensity less than 40 volts and to render said channel operative when said amplified carrier signal has an intensity greater than 40 volts.

3. A radio receiver system as claimed in claim 2, wherein said audio channel further comprises a diode and means for connecting said control tube to said diode thereby to render said diode selectively operative.

4. A radio receiver system as claimed in claim 2, further comprising a diode having a cathode and an anode, said control tube having a cathode, an anode and a control grid, the anode of said diode being connected to the anode of said control tube, the control grid of said control tube being connected to the anode of said further rectifying means thereby to render said diode conductive upon the occurrence of a negative regulating voltage of predetermined intensity.

5. A radio receiver system as claimed in claim 2, further comprising a diode having a cathode and an anode, said control tube having a cathode, an anode and a control grid, power supply means, a resistor connected between the positive terminal of said power supply means and a point at ground potential, the cathode of said diode being connected to a point of said resistor, the anode of said diode being connected to the anode of said control tube, a resistor connecting said last-mentioned anodes to the positive terminal of said power supply means, means for connecting the cathode of said control tube to said point at ground potential, and means for connecting the control grid of said control tube to the anode of said further rectifying means thereby to render said diode non-conductive when said amplified carrier signal has an intensity less than 40 volts.

6. A radio receiver system as claimed in claim 5, further comprising a capacitor connected in shunt across said diode.

7. A radio receiver system comprising input means for a source of carrier signal, said carrier signal being modulated by an audio intelligence signal, amplifying means for said carrier signal, said amplifying means having an amplification normally producing an output signal having an intensity greater than 40 volts when a usable carrier signal is applied to the input thereof, rectifying means coupled to the output of said amplifying means, said rectifying means comprising an unidirectionally conducting element having an anode and a cathode, means for applying a threshold voltage of at least 40 volts to said rectifying means thereby to produce an output regulating voltage having an intensity as defined by the intensity of said amplified carrier signal greater than 40 volts and to render said rectifying means inoperative to carrier signals applied thereto having an intensity less than 40 volts, power supply means having a positive terminal and a negative terminal, said means for applying a threshold voltage comprising voltage dividing means connected in parallel with said power supply means, further rectifying means coupled to the output of said amplifying means, said further rectifying means comprising a second unidirectionally conducting element having an anode and a cathode, means for interconnecting the anodes of said unidirectionally conducting elements, means for applying said regulating voltage to said amplifying means to vary the amplification thereof, said means for applying said regulating voltage being connected to the anode of said second unidirectionally conducting element, means for deriving said audio intelligence signal from said carrier signal, an audio intelligence signal channel coupled to said deriving means and comprising a control tube having a cathode, an anode and a control grid connected to said second unidirectionally conducting element, a diode having a cathode and an anode, said diode being controlled in operation by the output of said control tube to render said channel inoperative when said amplified carrier signal has an intensity less than 40 volts and to render said channel operative when said amplified carrier signal has an intensity greater than 40 volts, the anode of said diode being connected to the anode of said control tube, a resistor connecting said last-mentioned anodes to the positive terminal of said power supply means, a resistor connected between the positive terminal of said power supply means and a point at ground potential, the cathode of said diode being connected to a point of said resistor, means for connecting the cathode of said control tube to said point at ground potential, and means for connecting the control grid of said control tube to the anode of said further rectifying means thereby to render said diode non-conductive when said amplified carrier signal has an intensity less than 40 volts, and a capacitor connected in shunt across said diode.

8. A radio receiver system as claimed in claim 7, wherein said means for applying a threshold voltage comprises a glow discharge device and a resistor, said discharge device and resistor being connected in series across said power supply means.

9. A radio receiver system comprising input means for a source of carrier signal, amplifying means for said carrier signal, said amplifying means having an amplification normally producing an output signal having an intensity greater than 40 volts when a usable carrier signal is applied to the input thereof, rectifying means coupled to the output of said amplifying means, power supply means, means for applying a threshold voltage of at least 40 volts to said rectifying means thereby to produce an output regulating voltage having an intensity as defined by the intensity of said amplified carrier signal greater than 40 volts and to render said rectifying means inoperative to carrier signals applied thereto having an intensity less than 40 volts, said last-mentioned means comprising a glow discharge device and a resistor, said discharge device and resistor being connected in series across said power supply means, and means for applying said regulating voltage to said amplifying means to vary the amplification thereof.

References Cited in the file of this patent

UNITED STATES PATENTS

| | | |
|---|---|---|
| 2,117,664 | Holst | May 17, 1938 |
| 2,173,248 | Braden | Sept. 19, 1939 |
| 2,243,423 | Hollingsworth | May 27, 1941 |
| 2,539,042 | Toporeck | Jan. 23, 1951 |